(No Model.) 2 Sheets—Sheet 1.
G. D. BURTON & E. E. ANGELL.
ELECTRIC COOKING APPARATUS.
No. 475,190. Patented May 17, 1892.
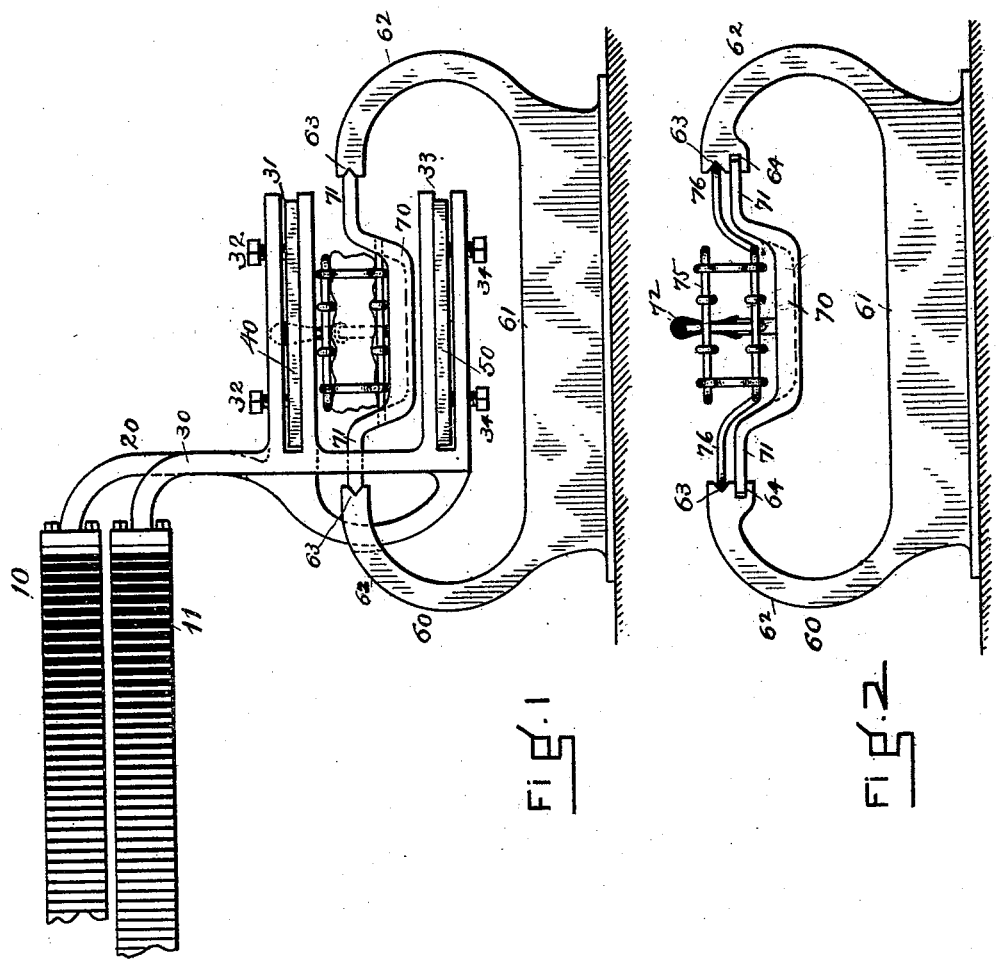
WITNESSES
E. F. Philipson
Chas. F. Adams
INVENTORS
G. D. Burton
E. E. Angell
By F. C. Somes,
Attorney.

(No Model.) 2 Sheets—Sheet 2.
G. D. BURTON & E. E. ANGELL.
ELECTRIC COOKING APPARATUS.
No. 475,190. Patented May 17, 1892.
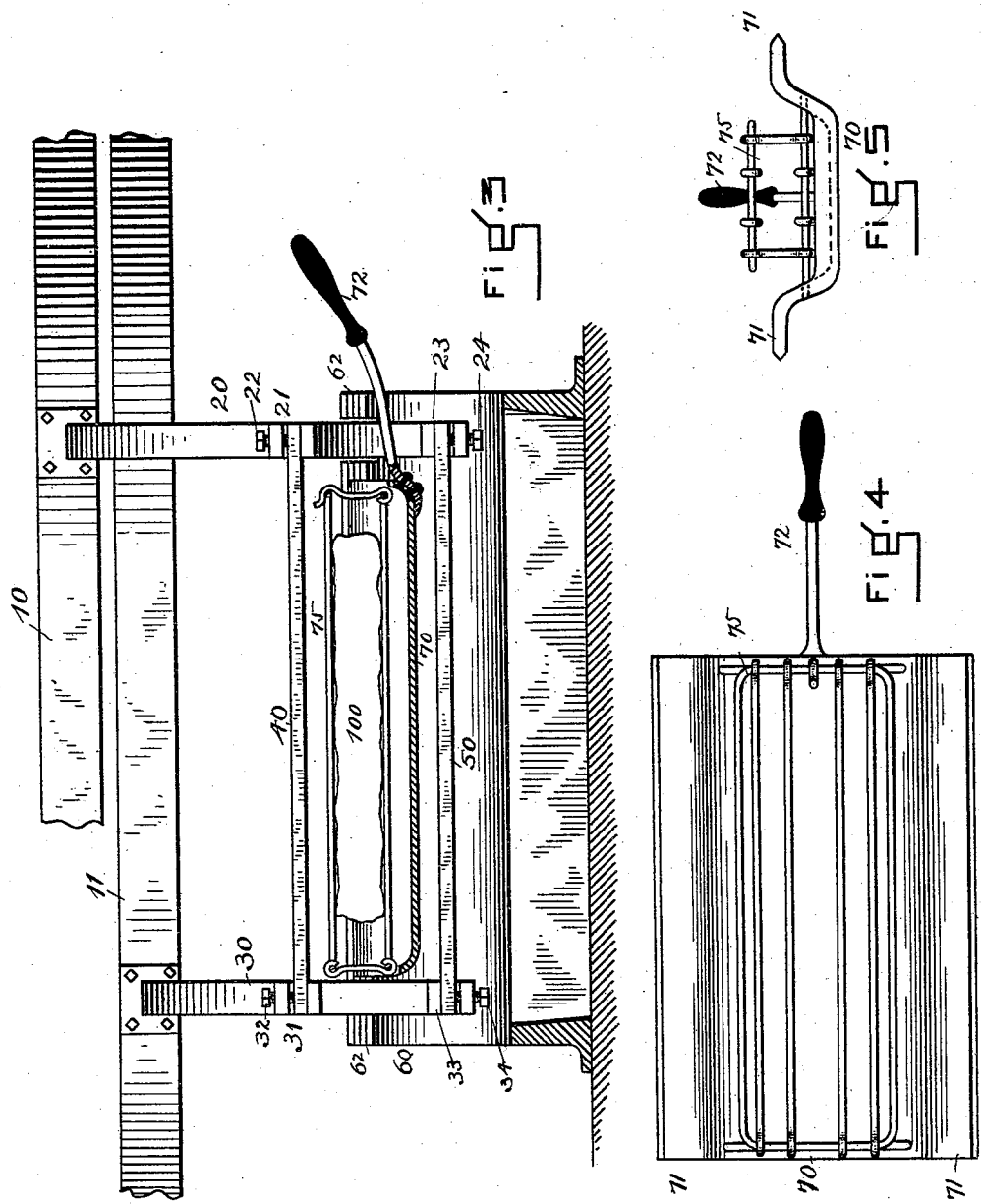
WITNESSES:
E. F. Philipson
Chas. F. Adams.
INVENTORS:
G. D. Burton
E. E. Angell
By F. C. Somes,
Attorney

UNITED STATES PATENT OFFICE.

GEORGE D. BURTON, OF BOSTON, AND EDWIN E. ANGELL, OF SOMERVILLE, MASSACHUSETTS, ASSIGNORS TO THE ELECTRICAL FORGING COMPANY, OF MAINE.

ELECTRIC COOKING APPARATUS.

SPECIFICATION forming part of Letters Patent No. 475,190, dated May 17, 1892.

Application filed May 29, 1891. Serial No. 394,522. (No model.)

*To all whom it may concern:*

Be it known that we, GEORGE DEXTER BURTON, residing at Boston, in the county of Suffolk, and EDWIN ELLIOTT ANGELL, residing at Somerville, in the county of Middlesex, State of Massachusetts, citizens of the United States of America, have invented a new and useful Improvement in Electric Cooking Apparatus, of which the following is a specification.

The object of this invention is to provide a simple and convenient apparatus for broiling, roasting, or otherwise cooking by electricity.

Figure 1 of the accompanying drawings represents an end elevation of this improved cooking apparatus. Fig. 2 represents an end elevation of the holder for the cooking utensils detached from the oven or heating-electrodes. Fig. 3 represents a side elevation of this improved cooking apparatus. Fig. 4 represents a plan of a broiler and drip-pan used in connection with this apparatus. Fig. 5 represents an end elevation of a broiler and drip-pan constituting a part of this improved cooking apparatus.

Similar numerals of reference indicate corresponding parts in the different figures.

The rings 10 and 11, whereof segments only are represented in the drawings, constitute parts of an electric-current converter, which need not be fully illustrated in this case. A bracket 20, composed of copper or other suitable conductive material, is attached to the ring 10 and depends therefrom, and a bracket 30, also composed of copper or other suitable conductive material, is attached to and depends from the negative ring 11. The bracket 20 is provided with a laterally-projecting slotted arm 21, provided with clamping-screws 22 and with a similar horizontally-projecting slotted arm 23, disposed below the arm 21 and provided with clamping-screws 24. The bracket 30 is also provided with a laterally-projecting slotted arm 31, disposed in the same horizontal plane as the arm 21, and with a slotted arm 33, disposed in the same vertical plane with the arm 31 and in the same horizontal plane with the arm 23. These arms 31 and 33 are provided, respectively, with clamping-screws 32 and 34.

A heating-plate 40, composed of iron, steel, carbon, or other suitable material of a higher current-resistance than the material of the brackets and arms, is disposed at its opposite ends within the slots of the arms 21 and 31 and clamped therein by set-screws 22 and 32. A similar heating-plate 50, composed of similar material, is disposed at its opposite ends in the slotted arms 23 and 33 and clamped therein by means of the set-screws 24 and 34. These heating-plates span the space between the brackets 20 and 30, the plate 40 serving as a top plate and the plate 50 as a bottom plate.

A holder 60 for the utensils containing the articles to be cooked comprises a base 61 and four arms 62, disposed in pairs at opposite ends of the base and extending upward and inward therefrom. The upper inner ends of these arms are provided with grooves or notches 63, and may also be provided with a second set of notches 64. The cooking utensil is suspended between the arms 62, being provided with flanges or lugs, which engage the notches thereof.

The cooking utensil illustrated in Figs. 1, 3, 4, and 5 comprises a drip-pan 70, having side flanges 71, which engage the notches 63 of the holder 60. A broiler 75 is attached to said drip-pan, and a handle 72 is attached to one end of said drip-pan. In Fig. 2 the broiler is shown as independent of the drip-pan, being provided with arms 76, which engage the notches 63 of the holder, while the drip-pan engages the notches 64 thereof.

In the use of this improved cooking apparatus the holder 60 for supporting the cooking apparatus is disposed in a plane below the heating-plates in such relation thereto that the supporting ends of the arms 62 are in a horizontal plane about midway between the upper heating-plate 40 and the lower heating-plate 50. The article to be cooked—as, for instance, a steak 100 to be broiled—is placed in the cooking utensil or broiler 75 and said broiler inserted in the holder 60 between the heating-plates 40 and 50. The electric current is passed from the ring 10 to the ring 11, through the brackets 20 and 30, through the arms 21 and 23, through the arms 31 and 33, and through the heating-plates 40 and 50. These plates, being of greater resistance than the conductors leading thereto and therefrom, are heated to a red or incandescent heat, and the steak is broiled or roasted by the heat radiated from said plates, being cooked on both sides at the same time.

The apparatus may be inclosed in a casing to protect it from the cooling effects of the atmosphere and preserve the heat of the electrodes 40 and 50.

A rheostat may be used for regulating the current.

A bread-pan may be disposed in the holder 60, instead of the broiler, for baking bread, biscuits, cake, and other articles.

The drip-pan 70 may serve as the baking-pan.

Any other cooking utensil may be suspended or supported between the radiating or heating plates 40 and 50 or placed in contact therewith.

We claim as our invention—

1. In an electric cooking apparatus, the combination of two conductive clamps or holders connected with opposite electric poles, a radiating-plate, of greater resistance than the holders, serving to close the circuit between them, and a holder for a cooking utensil disposed adjacent to said plate for holding said utensil within the heating influence thereof, said holder for the cooking utensil comprising a base provided with upward and inwardly extending arms having notches to be engaged by the cooking utensil.

2. In an electric cooking apparatus, the combination of two heating-plates, conductors connected with opposite electric poles and with said plates for passing a current therethrough sufficient to heat said plates to an incandescent heat, and a holder for suspending a cooking utensil between said plates.

3. In an electric cooking apparatus, the combination of two converter-rings constituting opposite electric poles, two holders mounted, respectively, thereon, and a radiating-plate of greater resistance than the holders and serving to close the circuit between them, substantially as described.

4. In an electric cooking apparatus, the combination of two converter-rings constituting opposite electric poles, two holders mounted, respectively, thereon, and an incandescent radiating-plate of greater resistance than the holders and serving to close the circuit between them, substantially as described.

5. In an electric cooking apparatus, the combination of two pairs of arms or holders connected, respectively, to opposite electric poles, and horizontal radiating-plates, of greater resistance than said holders, disposed one above the other in said holders and serving to close the circuit between opposite arms of each pair, said plates being adapted to receive between them articles to be cooked, substantially as described.

6. In an electric cooking apparatus, the combination of two converter-rings, brackets connected, respectively, thereto, two pairs of slotted horizontal arms extending from said brackets and disposed in different planes, a heating-plate connecting the arms of one pair and serving to close the circuit between them, and a heating-plate disposed in the slotted arms of the other pair and serving to close the circuit between them, substantially as described.

GEO. D. BURTON.
EDWIN E. ANGELL.

Witnesses:
CHAS. E. DRESSER,
W. H. KIMBALL.